United States Patent [19]

Nussbaumer

[11] 3,814,917

[45] June 4, 1974

[54] SIGNAL PROCESSING DEVICE FOR WEIGHTING DELTA CODED SEQUENCES BY PAIR WISE SUMMATION OF COEFFICIENTS ACCORDING TO THE MATCHING CONDITION OF COUNTERPART DELTA DIGITS

[75] Inventor: Henri J. Nussbaumer, Lagaude, France

[73] Assignee: International Business Machines Corporation, Armonk, N.Y.

[22] Filed: May 29, 1973

[21] Appl. No.: 364,843

[30] Foreign Application Priority Data

June 1, 1972 France ............................ 72.20510

[52] U.S. Cl. .................. 235/152, 325/42, 328/162, 333/28 R

[51] Int. Cl. ............................................ G06f 7/38

[58] Field of Search ............. 235/152, 156; 325/42; 328/162; 333/28

[56] References Cited

UNITED STATES PATENTS

| | | | |
|---|---|---|---|
| 3,586,267 | 7/1971 | Goodman | 325/42 X |
| 3,633,170 | 4/1972 | Jones | 340/172.5 |
| 3,651,316 | 3/1972 | Gibson | 325/42 X |

OTHER PUBLICATIONS

Jackson, et al.; IEEE Trans. on Audio and Electro-Acoustics, Vol. AU-16, No. 3, Sept. 1968, pgs. 413-421.

*Primary Examiner*—Felix D. Gruber
*Assistant Examiner*—James F. Gottman
*Attorney, Agent, or Firm*—Robert B. Brodie

[57] ABSTRACT

An input analog signal is sampled and then Δ coded. The resulting Δ bits $x(t-\tau)$, $x(t-2\tau)$, $x(t-3\tau)$-$x(-t-2N\tau)$ are recirculated through a shift register at a frequency $N$ times higher than the sampling frequency. The high cycling rate makes it possible to automatically multiplex the coefficient weighting of the Δ coded bits coming from the shift register. The multiplexing operation is carried out in such a manner such that at each shift instant, two Δ bits are available in parallel. The weighting coefficients $C_1$, $C_2$, $C_3$-$C_{2N}$ are processed pair wise in the form of sums and differences ($\pm C_1 \pm C_2$); ($\pm C_3 \pm C_4$) of the coefficients, the sum or difference being formed according as to whether the counterpart pair of Δ bits matched or mismatched (00, 01, 10, 11) i.e., $x(t-\tau) > x(t-2\tau)$, $x(t-\tau) < x(t-2\tau)$ or $x(t-\tau) = x(t-2\tau) = [_0{}^1$. The relative values of two Δ coded bits coming from the shift register at a given instant control the selection of binary characters available in the parallel form and being representative either of the sum of the cwo corresponding coefficients or the different thereof, or the value opposite to the sum or the value opposite to the difference. These binary characters are successively accumulated in the accumulator, the output of which supplies a differential PCM-coded sample of the filtered signal, upon each period of the sampling frequency.

2 Claims, 4 Drawing Figures

ALTERNATIVE EMBODIMENT OF INPUT CIRCUIT

INPUT CIRCUITS & EQUALIZER DELAY

EQUALIZER COEFFICIENT MULTIPLICATION AND SUMMATION CIRCUITS

SIGNAL PROCESSING DEVICE FOR WEIGHTING DELTA CODED SEQUENCES BY PAIR WISE SUMMATION OF COEFFICIENTS ACCORDING TO THE MATCHING CONDITION OF COUNTERPART DELTA DIGITS

BACKGROUND OF THE INVENTION

This invention relates to the processing of digitally coded analog signals by means of the so-called "delta-modulation" technique and, more particularly, it concerns the multiplication and weighting of such signals by digital coefficients. At present, the digital techniques show an increasing tendency to replace the analog techniques for signal processing. In the data transmission field, more specifically, there are many advantages in digitally converting the analog signal, which carries the data and is received from the transmission medium, in order to carry out the various processing operations before detection.

The conversion is carried out in a conventional manner by sampling of the analog signals and coding of the samples. There are two main types of coding: the so-called pulse-code-modulation coding (PCM) and the so-called delta-modulation coding. In PCM coding, the analog signal to be digitally coded is sampled and the amplitude of each sample is quantized by means of a scale of numbers. The number characterizing such an amplitude is expressed in the binary form in the two's complement code, for instance. Thus, the digital signal representative of the analog signal appears in the form of a succession of binary words, each word being representative of the amplitude of an analog signal sample. In delta coding, it is the sign of the difference in the amplitudes between one sample and the preceding one which is taken into consideration. This sign is binary-coded with two possible values: + 1 when the sign is positive, − 1 when the sign is negative, for instance. Thus, the digital signal representative of the analog signal appears in the form of a succession of binary elements, each element being representative of the direction of the variation in amplitude of an analog signal sample with respect to the amplitude of the preceding sample.

This invention pertains to the latter type of analog-to-digital coding technique. When processing signals coded in the digital form, sequences of delta-coded binary elements (which will be called in the following description "delta bits") have often to be multiplied by coefficients expressed in any binary code, which, for instance, can be the two's complement code. This will be the case, for instance, when filtering the signal by digital techniques. The term "filtering" means, here, the operation which consists in passing the signal to be filtered into a fixed transfer function network (such as is the case for filters, in the conventional sense of the word) or into a variable transfer function network (such as is the case for transmission equalizers).

Digital filtering techniques are now well-known in the art and reference can be made to the article of Jackson, Kaiser and McDonald published in the review "IEEE Transactions on Audio and Electro-Acoustics," Vol. AU-16, No. 3, under the title: "An Approach to the Implementation of Digital Filters," Sept, 1968, for specific embodiments. In a conventional manner, a digital filter is comprised of one or a plurality of delay element assemblies provided with taps to which multiplying coefficients are assigned (fixed or variable), and one or a plurality of adders or accumulators, the output of one of these accumulators supplying the filtered signal.

There have developed two parallel technical approaches toward attainment of cost reduction of coefficient multipliers for digital filters. They are table look-up and special algorithms. With respect to table look-up, Jackson, in U.S. Pat. No. 3,522,546, simplified coefficient multiplication by supplying the coefficients on a time shared basis to multipliers from a read only memory. Deerfield in U.S. Pat. No. 3,370,292 was the first to use table look-up by an intermediate signal as a substitute for multiplication. Indeed, Croisier et al. in two applications, U.S. Ser. No. 189,974 and 208,345 filed respectively on Oct. 18, 1971 and Dec. 15, 1971 use the direct addressing of a read only memory for both recursive and non-recursive digital filters. However, table look-up is feasible only where the digits being multiplied are few. It should be recalled that because digital filtering occurs in the time domain, a multi-stage shift register holding $N$ input signals and using $M$ coefficient bits, would need $2^N \times 2^M = 2^{N+M}$ addressable memory locations. If $N = M = 8$, then $2^{N+M} = 2^{16} = 65536$ locations must be available.

Special multiplication algorithms and their hardware embodiments have diverse sources. One is first reminded of Booth's Algorithm. Booth's Algorithm is directed to the multiplication of MxR where M and R are ordinary binary numbers. If one lets $M = m_0 2^0 + m_1 2^1 + m_2 2^2 + \text{---} + m_{2n+1} 2^{2n-1}$ be the multiplier, then the product $M \times R$ is $m_0 2^0 R + m_1 2^1 R + m_2 2^2 R + \text{---} + m_{2n-1} 2^{2n-1} R$. Note that $m_i = [{}_0^1$. As originally described in 1951 in a paper entitled, "A Signed Binary Multiplication Technique" appearing in The Quarterly Journal of Mechanics and Applied Mathematics, Volume 4, Part 2, at page 237–240, the algorithm provided that > "the multiplication starts with the least significant digit, and may be described as follows:
>
> To multiply two numbers m and R together, examine the $n^{th}$ digit ($m_n$) of $m$,
>
> 1. If $m_n = 0$, $m_{n+1} = 0$, multiply the existing sum of partial products by $2^{-1}$, i.e., shift one place to the right.
> 2. If $m_n = 0$, $m_{n+1} = 1$, add $R$ into the existing sum of partial products and multiply by $2^{-1}$, i.e., shift one place to the right.
> 3. If $m_n = 1$, $m_{n+1} = 0$, subtract $R$ from existing sum of partial products and multiply by $2^{-1}$, i.e., shift one place to the right.
> 4. If $m_n = 1$, $m_{n+1} = 1$, multiply the sum of the partial products by $2^{-1}$, i.e., shift one place to the right."

Restated, Booth examined the match and mismatch condition among successive overlapping pairs of coefficients from least to most significant, i.e., $(m_0 m_1)$ $(m_1 m_2)$ $(m_2 m_3)$, and if the digits matched shift an associated accumulator contents to the right by $2^{-1}$. If the coefficients $m_i \neq m_{i+1}$ then the sign and magnitude R was added to the accumulator and shifted. This may be expressed in tabular form:

BOOTH

| $m_i$ | $m_{i+1}$ | Result |
|---|---|---|
| 0 | 0 | Shift by $2^{-1}$ |

-Continued

BOOTH

| | | |
|---|---|---|
| 0 | 1 | +R and shift by $2^{-1}$ |
| 1 | 0 | −R and shift by $2^{-1}$ |
| 1 | 1 | Shift by $2^{-1}$ |

Unfortunately, such an algorithm while prominent in binary digital multiplication simply does not lend itself to coefficient weighting of sequences of delta coded numbers. For more recent statements of Booth's algorithm, reference may be made to R. K. Richard's, "Arithmetic Operations in Digital Computers," D. Van Nostrand Co., New York, 1955, pages 164–165. This is expanded in his second treatise, "Digital Design," John Wiley & Sons, New York, 1971, at pages 340–341.

If one were to speculate as to the reason that an algorithm suitable for use in the multiplication of two binary numbers would not work with multiplying delta coded digits, the answer resides in that the delta coding of an analog wave is a finite differential process, which although as a coding sequence it exhibits a digital form, the sequence nevertheless retains its finite differential properties, i.e., the slope indication of the $i^{th}$ sample is dependent upon the indication of the $i$–1 sample, etc. Such a relationship does not exist among consecutive digits in an ordinary binary number.

In order to illustrate one algorithmic approach to prior art delta code multiplication, reference is made to R. Malm, U.S. Pat. No. 3,479,495 issued Nov. 18, 1968, entitled "Signal Correlation System Using Delta Modulation." Malm argued that the cross correlation of one analog wave form $u(t)$ with another analog wave form $v(t)$ could be thought of as a process of forming the differential of the product $Z = uv$, i.e., $dZ = udv + vdu$. Thus, if $u(t)$ and $v(t)$ were respectively delta coded as $du(t-\tau)$ and $dv(t)$, then, by processing them in parallel channels cross connected to form the partial products $u(t-\tau)\ dv(t)$ and $v(t)\ du(t-\tau)$, it would be possible to accumulate their sum and obtain the product $Z$ by integration, i.e., $Z = dx = udv + vdu$.

SUMMARY OF THE INVENTION

It is an object of this invention to devise a multiplication element or the like for coefficient weighting of individual delta coded digits of a sequence as for example typically found in transversal filter equalizers by an algorithmic rather than a table look-up technique.

It may be recalled that the output $Y(NT)$ of a time domain filter may be represented by the relation $$Y(NT) = a_0x(t) + a_1x(t-\tau) + a_2x(t-2\tau)$$

where $Y$ is the output for a given series of delta inputs $x$. Instead of multiplying each term $x_i$ by a coefficient $a_i$, it was unexpectedly observed that multiplication could be reduced to the successive algebraic addition of the sum or difference between consecutive pairs of coefficients $\pm(a_0 + a_1)$, $\pm(a_0 - a_1)$ as determined by the binary match or mismatch condition of the corresponding pair of delta coded digits. Since each delta coded digit assumes one of two values $+1$ or $-1$, then $Y(Nt) = \pm 1a_0 \pm 1a_1 \pm 1a_2 \pm 1a_3$, etc. It is then possible to evaluate the coded digits a pair at a time. In this regard, the successive pairs of coefficients do not have elements in common, i.e., $(a_0a_1)$ $(a_2a_3)$ $(a_4a_5)$ etc. In tabular form, this can be represented as

| $x(t-i\tau)$ | $x[t-(i+1)\tau]$ | Contents added to Accumulator |
|---|---|---|
| −1 | −1 | $-(a_{2i}+a_{2i+1})$ |
| −1 | +1 | $-(a_{2i}-a_{2i+1})$ |
| +1 | −1 | $+(a_{2i}-a_{2i+1})$ |
| +1 | +1 | $+(a_{2i}+a_{2i+1})$ |

Restated, this invention contemplates a process for carrying out the summation of two delta bit sequences which bits are weighted by binary coefficients, one coefficient being assigned to each delta bit. The process is characterized in that it includes the following steps: making the sums and difference of those coefficients which correspond to the delta bits of the same rank in the two sequences, in the parallel form, comparing the values of the two delta bits of a same rank in the two sequences, fetching the character which is representative of the sum of the corresponding coefficients when the combination of the two bits is 11 or 00, or the character which is representative of the difference of the coefficients when the combination is 01 or 10, presenting the binary character obtained at the preceding step, when the corresponding combination is 11 or 01, or the binary character which is representative of a value opposite to the one represented by the character obtained at the preceding step, when the corresponding combination is 10 or 00, to the inputs of an accumulator, accumulating the binary characters so presented for each bit rank in the two delta bit sequences.

The method of the invention is implemented by introducing delta bits resulting from the coding of the input signal into a recycling shift register through which they are cycled at a frequency higher than the sampling frequency, which makes it possible to automatically multiplex the bits coming from said shift register. The multiplexing operation is carried out in a manner such that, at each shift instant, two bits are available in parallel. The weighting coefficients then, are no more processed separately, but instead, two by two, in the form of sums and differences of the coefficients taken two by two. The relative values of two bits coming from the shift register at a given instant, control the selection of binary characters available in the parallel form and being representative either of the sum of the two corresponding coefficients or the difference thereof, or the value opposite to the sum or the value opposite to the difference. These binary characters are successively accumulated in the accumulator the output of which supplies a differential PCM-coded sample of the filtered signal, upon each period of the sampling frequency.

BRIEF DESCRIPTION OF THE DRAWINGS

FIG. 2b illustrates an alternative input arrangement to FIG. 2a.

DESCRIPTION OF THE PREFERRED EMBODIMENT

A preferred embodiment of the invention will now be disclosed in connection with an automatic transmission equalizer of the so-called transversal type, which is well-known in the technique. The general operating principles of the equalizers of such a type are described in the book of R. W. Lucky, J. Salz and H. Weldon, Jr., published by McGraw Hill in 1968 under the title, "Principles of Data Communications," chapter VI. Reference will more specifically be made to the phase modulation transmission equalizer disclosed (FR9-71-018) in copending U.S. Pat. application Ser. No. 354,413, filed April 23, 1973 in the name of A. Lautier et al. and entitled, "An Equalizer for Phase Modulation Communications Systems Using the Instantaneous Carrier Envelope Weighted by Peak Carrier Distortion as an Adjustment Control Signal."

Figure 1:
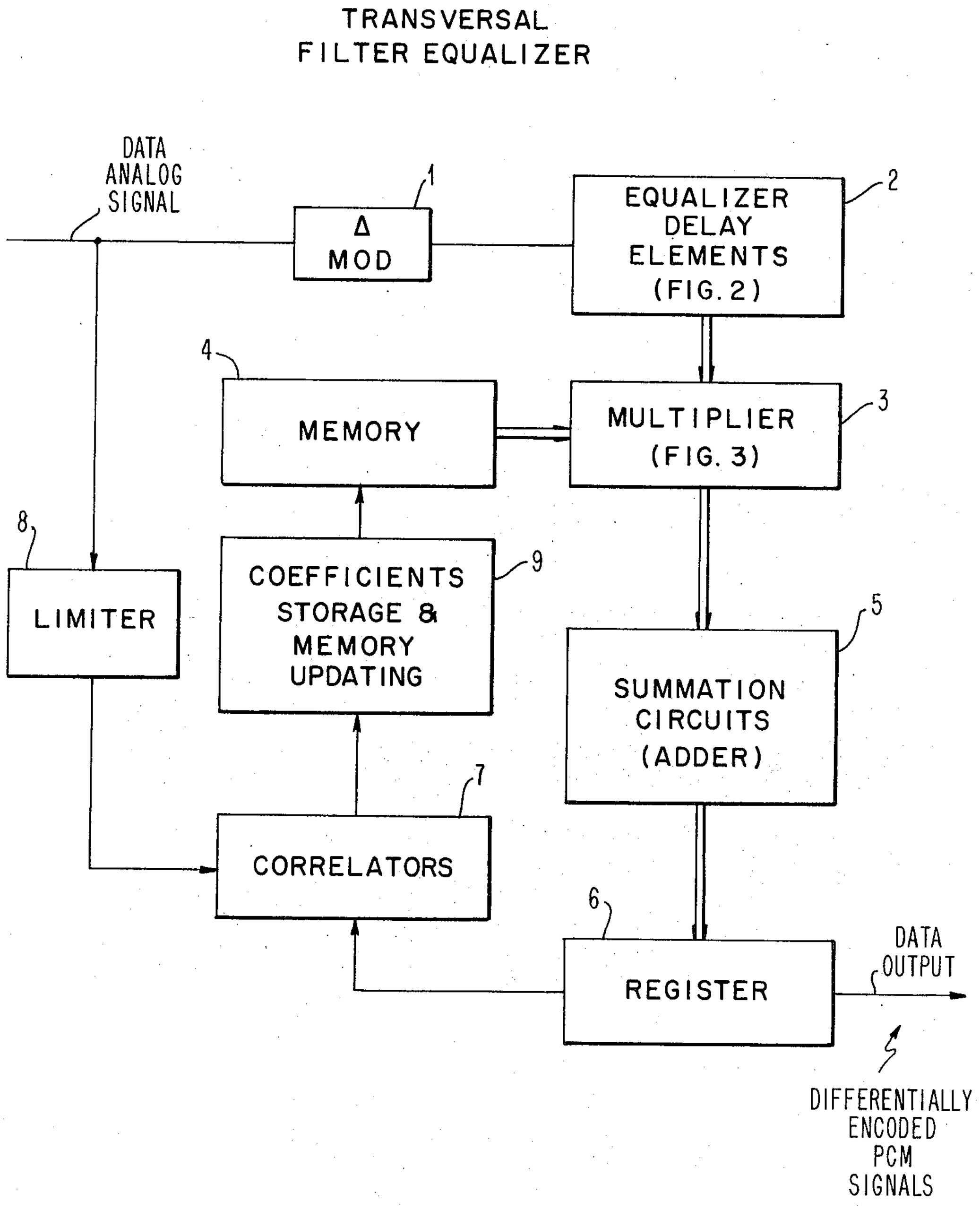
FIG. 1 shows a time domain self-adjusting equalizer of the transversal time responsive to delta coded sequences and incorporating the multiplier or like device according to the invention.

Referring now to FIG. 1, there is shown the general arrangement of such an equalizer. The equalizer receives the analog signal from the transmission medium in a conventional manner and is comprised of an analog-to-digital coder 1 of the delta type which transforms the analog signal into a delta-coded digital signal. The delta bits are sent to a delay device which is formed of a succession of elementary delays $\tau$ and which includes $2N$ taps (not shown). The signals taken from these taps are multiplied in multiplying assembly 3 by coefficients extracted from memory 4. The products obtained in multiplying assembly 3 are added in adder 5 in order to supply the equalized signal. This equalized signal is sent to data detection and error generation circuits which supply both the transmitted data and binary error information. This binary error information is applied to an assembly of Exclusive OR circuits 7 at the same time as the information about the sign of the analog input signal obtained from limiter 8. The circuits of assembly 7 play the part of correlators for correlating the sign of the input signal with the sign of the error signal. The output of assembly 7 is connected to an assembly of elements 9 which are used to update the coefficients of memory 4 so as to tend to cancel said error signal.

The operating principle of such an equalizer in detail is given in the article by Hirch and Wolf which is entitled, "A Simple Adaptive Equalizer for Efficient Data Transmission," published by Wescon IEEE in Wescon Technical Papers, 1969, part IV, Section 11-2. This invention concerns the implementation of the circuits which can be used more specifically in such equalizers, circuits which will now be described with reference to FIGS. 2 through 5.

Figure 2B:
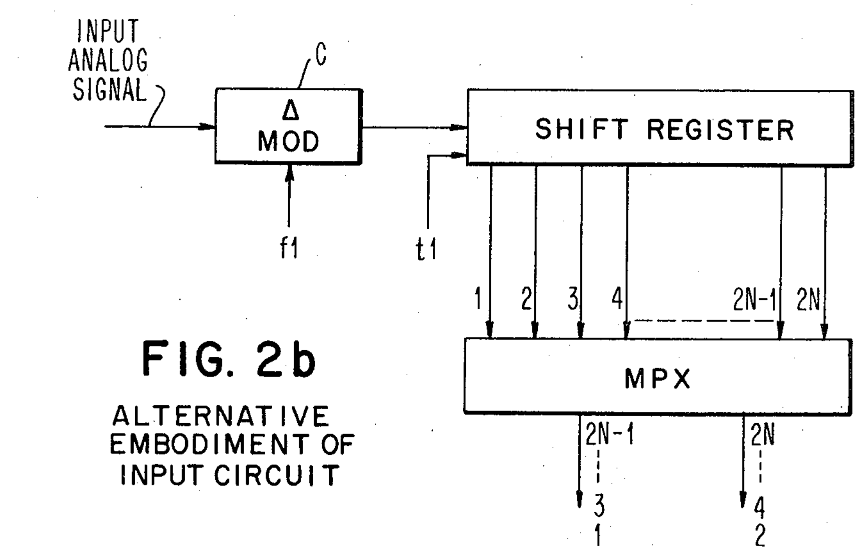
Figure 2A:
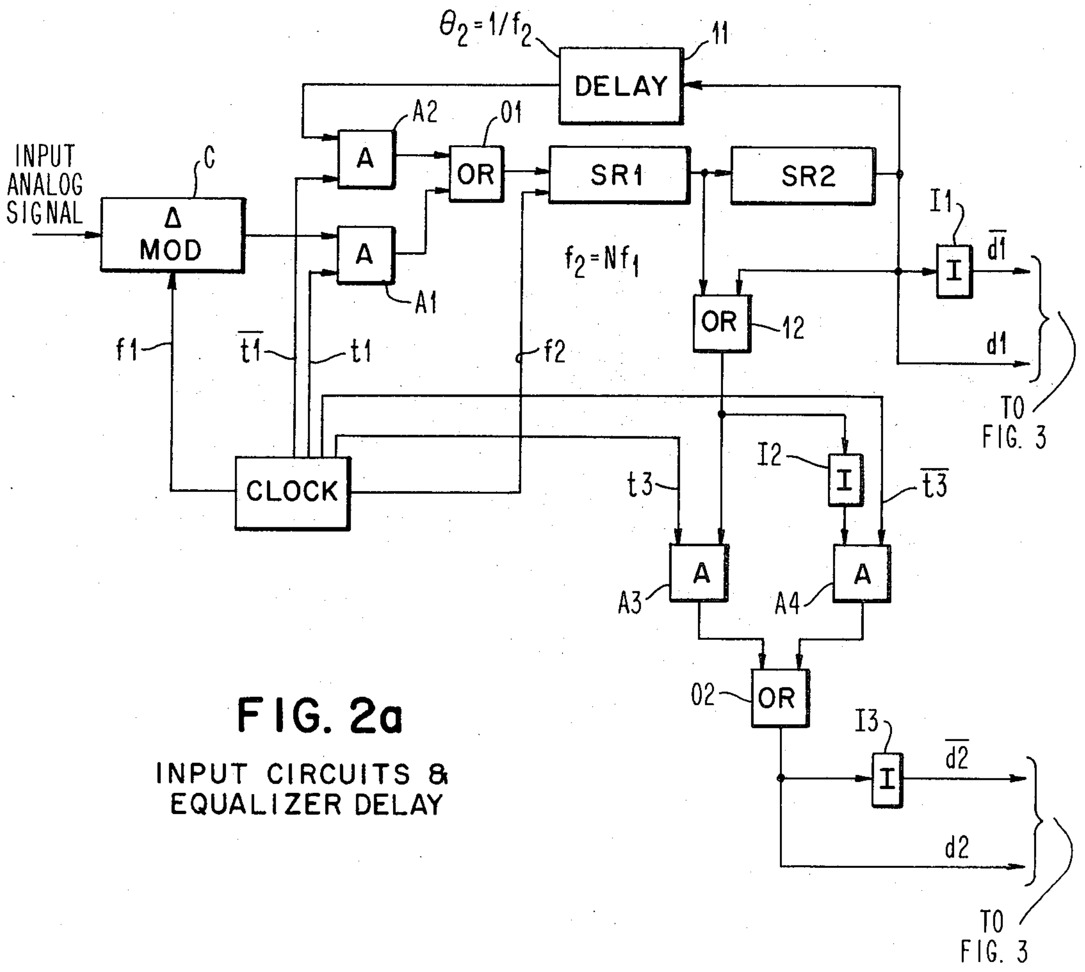
FIG. 2a sets forth the input circuits and re-entrant shift register utilized by the equalizer.

FIG. 2*a* shows the input circuits of the equalizer, namely blocks 1 and 2 of FIG. 1. Delta coder C receives the analog signal and codes into the delta modulation code. The frequency of the analog signal sampling will be designated by $f1$. Delta coder C can be, for instance, of the type disclosed in copending U.S. Pat. application Ser. No. 226,473 filed by the applicant on Feb. 15, 1972, under the title, "Servo-Balanced Delta Modulator."

Therefore, a succession of bits is obtained at the delta coder output, at a rate defined by frequency $f1$. The term "coding bit period" will mean the time interval separating two adjacent bits at the coder output, namely $\phi 1 = 1/f1$. These bits are introduced, through AND gate A1 and OR gate 01, into a delay device which is comprised of two shift registers $SR_1$ and $SR_2$ which are series-mounted. AND gate A1 is controlled by a clock signal + 1, at frequency $f1$ so as to pass the bits coming from coder C. Registers $SR_1$ and $SR_2$ are shifted by means of a clock of frequency $f2$. Each register $SR_1$ and $SR_2$ is of a bit capacity equal to $N\ \tau/\phi 1$, assuming that $\tau$ is an integral multiple of $\phi 1$ and that shift frequency $f2$ is equal to $Nf1$, which is always feasible. The output of register $SR_2$ is looped back to the input of register $SR_1$ through the intermediary of delay element 11, AND gate A2 and OR gate 01. Delay $\phi 2$ introduced by delay element 11 is equal to the time interval between two adjacent bits at the output of register $SR_2$, namely $\phi 2 = 1/f2$. The term "register bit period" will be used for designating $\phi 2$ and it can be seen that $\phi 1 = N\phi 2$ since $f2=Nf1$. Gate A2 is controlled to be closed only when gate A1 is open; the corresponding control signal has, therefore, been designated by $\tau_1$. The output of register $SR_2$ supplies also a first polarity control signal dl as well as signal $d1$, through interver 11. This very output of register $SR_2$ is, on the other hand, applied to an Exclusive OR circuit 12 which receives the output of register $SR_1$ on its other input. The output of circuit 12 is directly sent to an input of AND gate A3 and to an input of AND gate A4, through intermediary of inverter 12. Gates A3 and A4 are respectively controlled by the two complementary time signals $+3$ and $\overline{+3}$. The outputs of AND gates A3 and A4 are connected to an OR circuit 02 the output of which supplies a selection control signal $d2$ and the complementary signal $\overline{d2}$, through intermediary of inverter 13.

FIG. 2*b* shows a schematic diagram of a circuit assembly which produces the same result as the shift register-input and loop circuit shown in FIG. 2*a*. The schematic diagram of FIG. 2*b* is the conventional diagram of delay device SR of a transversal digital equalizer, which is well-known in the art, followed with a multiplexing device MPX for subsequent processing according to the principles of this invention. Delay device SR is a shift register having 2N taps with an elementary delay $\tau$ between any two adjacent taps, which receives the delta coded analog signal from coder C at sampling frequency + 1. Register SR is shifted at the same frequency $f1$ by a clock signal + 1 supplying a shift pulse every $\phi 1$ second, assuming $\phi 1 = 1/{+1}$, as seen above. The outputs 1 through 2N of the corresponding taps of register SR are applied to multiplexing device MPX which supplies two parallel bit sequences, within each period $\phi$, one sequence containing the outputs of the even rank taps, the other one the outputs of the odd rank taps. Thus, should $x(t)$ be representative of the input digital signal, the first sequence will successively present signal $x(t-\tau)$, $x(t-3\tau)$ . . . $x\ t-(2N-l)\tau$; whereas the second sequence will show, in a parallel manner to the first one, the successive values $x(t-2\tau)$, $x(t-4\tau)$ . . . $x(t-2N\phi)$.

The device shown in FIG. 2a is equivalent to the conventional 2N-tap delay device with an elementary delay $\tau$ as set forth in FIG. 2*b*, and a delay device the taps of which would be multiplexed, 2 by 2. Indeed, when considering the outputs of registers $SR_1$ and $SR_2$ at a given instant $t$, which is coincident with one of the instants +1 for the opening of gate A1, the output of $SR_1$ is representative of the delta bit introduced into $SR_1$ from gate A1, one instant $(t-N(\tau/\phi 1)\phi 2)$ before, i.e., that bit which has been submitted to a time shift equal to the product of the number of positions in $SR_1$ (namely $N[\tau/\phi 1]$) by the register bit period (namely $\phi 2$). But it has been said above that $\phi 1 = N\phi 2$. Therefore, the bit coming from $SR_1$ at time t is representative of the bit entered at time $(t-\tau)$, namely of signal $x(t-\tau)$. Likewise, it could be shown off that the bit coming from register $SR_2$ at the same time t corresponds to the bit entered from the gate A1 at instant $(t-2N[\tau/\phi 1]\phi 2)$, i.e., at instant $(t-2\tau)$. Thus, a given instant $t$, signals $x(t-\tau)$ and $x(t-2\tau)$ appear in parallel at the outputs of registers $SR_1$ and $SR_2$. At instant $t+\phi 2$, which is the following register bit period, the signal coming from $SR_1$ will be the signal entered in $SR_1$ at instant $(t+\phi 2-t)$ before. Indeed, this input bit will come from gate A2 since gate A1 is closed at instant $(t+\phi 2-t)$ and it will be representative of the bit entered from gate A1 at the previous opening instant of the latter, a bit which will have passed through the two registers $SR_1$ and $SR_2$ and which will have been looped back to the input of $SR_1$, having been submitted to a $\phi 2$ delay in circuit 11. The bit coming from $SR_1$ at instant $(t-\phi 2)$ will therefore correspond to a bit entered in $SR_1$ from gate A1 at instant $[(t+\phi 2)-2N(\tau/\phi 1)\phi 2-\phi 2-N(\tau/\phi 1)02]$, i.e., at instant $(t-3\tau)$. Likewise, the bit coming out at the same instant $t+\phi 2$ from register $SR_2$ will correspond to the bit entered in $SR_1$ from gate A1 at instant $t-4\tau$, and so on. Thus, upon each register bit period $\phi 2$, two signals come out of registers $SR_1$ and $SR_2$, in parallel. Over a coder bit period $\phi 1$, two sequences of successive signals are therefore obtained at the outputs of registers $SR_1$ and $SR_2$, which signals correspond each in the first sequence ($SR_1$ output), to a signal $x(t)$ entered in $SR_1$ from gate A1 and $\tau$ delayed an odd number of times and, in the second sequence ($SR_2$ output), to a signal $x(t)$ entered in $SR_1$ in like manner and $\tau$ delayed an even number of times.

Still proceeding with the explanation of FIG. 2*a*, it can be observed that two complementary control signals $dl$ and $\overline{dl}$ are extracted from the output of register $SR_2$. These control signals are simply indicative of the sign of the bit coming from $SR_2$ and their use will be specified further on with reference to FIG. 3. Besides, the Exclusive OR circuit 12, AND gates A3 and A4 and OR gate 02 are used for the comparison of the bits coming out of registers $SR_1$ and $SR_2$, in parallel and the transmission of two complementary control signals $d2$ and $\overline{d2}$ indicating whether these bit values are equal or opposite. Exclusive OR circuit 12 transmits a binary 1 when the bits are of opposite values, and it transmits a binary 0 when the bits are of the same value. While control signal +3 is high, AND gate A3 is open and $d2$ reproduces the output signal of Exclusive OR circuit 12. On the contrary, when +3 is low, gate A3 is closed but gate A4 is open and $d2$ reproduces the inverse of the output of circuit 12. The reason why this inversion takes place and the function of said signals $d2$ and $\overline{d2}$ will be studied with reference to FIG. 3 which will be described now.

Figure 3:
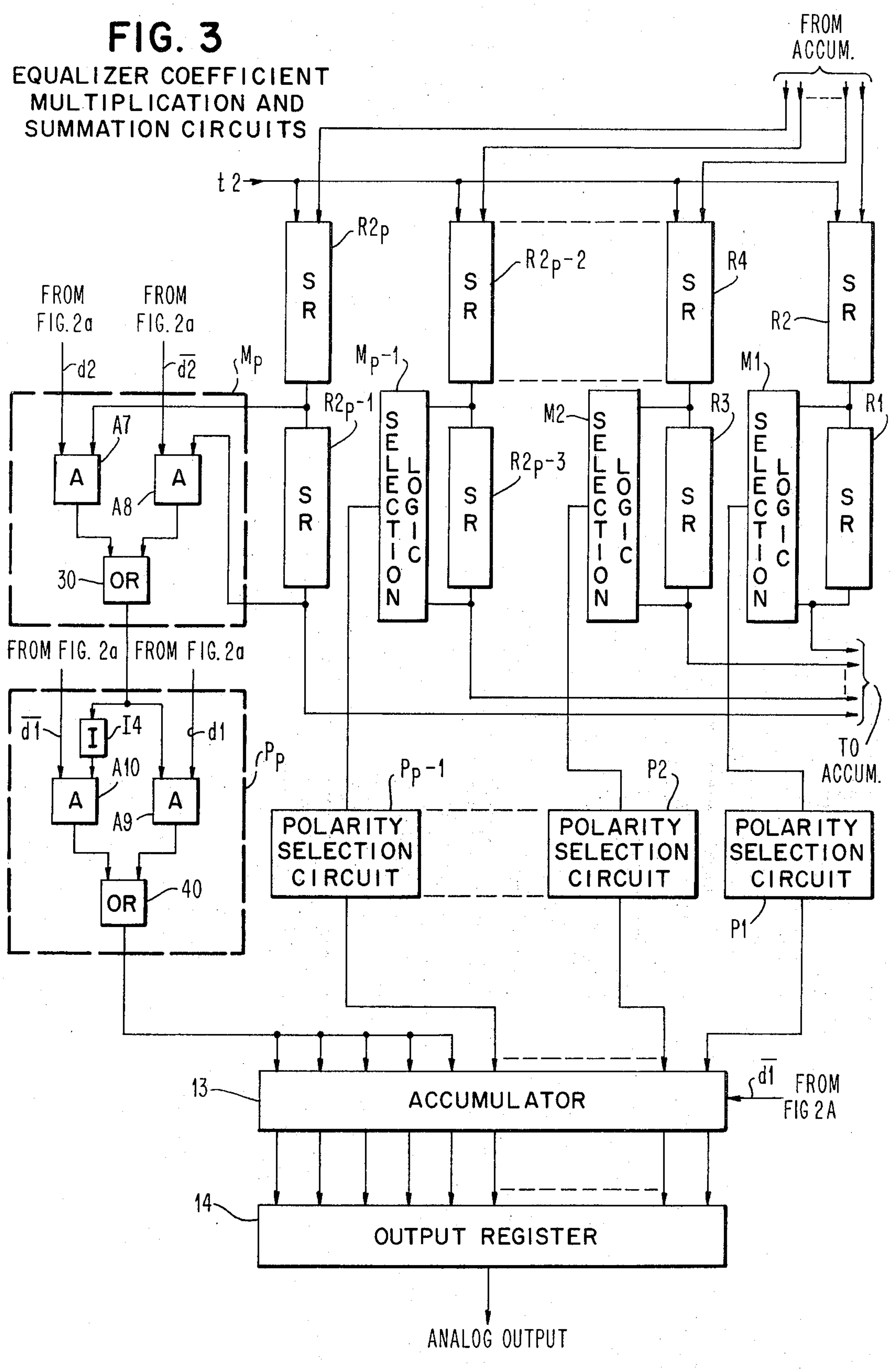
FIG. 3 is a schematic diagram of the equalizer coefficient-multiplication and summation circuits, according to this invention.

FIG. 3 shows a schematic diagram of the equalizer coefficient memory, the multiplication circuits and the accumulation circuits represented in FIG. 1 by blocks 4, 3, and 5, respectively. The coefficient memory is shown at the top of the figure in the form of p parallel-mounted shift register groups, each group containing two series-mounted registers. The registers are designated by $R_o$ and $R_{2p}$ and include, each, $N$ bit positions whereas the shift frequency is $f2$ for each of said registers, which is indicated by clock signal +2. It should be noted that the number of register groups depends only on the number of significant bits required to represent the equalizer coefficients. It should be admitted here, that the coefficients are determined by $p$ significant bits. In addition, it will be supposed that the coefficients are expressed in the binary code, the negative numbers being written in the two's complement form.

According to this invention, the necessary $2N$ coefficients are not stored in the form of separate coefficients but in the form of sums and differences of adjacent coefficients, two by two. Thus, should the coefficients be designated by $C_1, C_2 \ldots C_{2N-1}, C_{2N}$, the sums $C_1+C_2, C_3+C_4, \ldots C_{2N}-1C_{2N}$ and the differences $C_2-C_1, C_4-C_3 \ldots C_{2N-1}$ are stored in the registers. The storing operation is carried out in parallel through the inputs of registers $R_2, R_4 \ldots R_{2P}$ so that each register includes all the bits of a same rank in the previously mentioned sums and differences. When each of the registers is loaded, at the beginning of an operation cycle, the sums are stored, for instance, in the odd registers whereas the differences are, in the even registers, as shown in FIG. 3. It should be noted that, at the end of a period $\phi 2$, the N shifts which will have occurred in the registers will have caused an inversion in the meaning of the contents of these registers. Indeed, the differences of the coefficients will pass from the even registers to the odd registers and, due to a loop back connection which will be studied with reference to FIG. 5, the sums of the coefficients pass from the odd registers to the even registers. Such an inversion in the meaning of the contents of the even and odd registers, respectively, upon each coder bit period $\phi 1$, is taken into consideration by control signals +3 and $\overline{+3}$ which are also inverted upon each period $\phi 1$ and which cause, as said previously with reference to FIG. 2*a*, the inversion of the values of the selection control signals $d2$ and $\overline{d2}$. Because of this remark, the following description will refer only to what occurs within periods $\phi 1$ where the output of the even registers are representative of the differences of the coefficients and where the outputs of the odd registers are representative of the sums of the coefficients. In that case, control signal +3 is high. The other situation will be deduced therefrom very easily by interchanging the meaning of the outputs of the even and odd registers and by indicating that control signal +3 is low, which implies an inversion of selection control signals $d2$ and $\overline{d2}$, as said with reference to FIG. 2*a*.

A logic selection cell $M_1$ through $M_p$ is associated with each group of two registers. Only cell $M_p$ has been represented explicitly in order to make the understanding of the figure easier.

Register $R_{2p}$ output is sent to an AND gate A7 which receives, on the other hand, control signal $d2$ coming from OR circuit 02 of FIG. 2*a*. Likewise, register $R_{2p-1}$ output is sent to an AND gate A8 which receives, on the other hand, control signal $\overline{d2}$ coming from OR circuit 02 of FIG. 2*a*, through inverter 13. The output of the two AND gates A7 and A8 are applied to OR circuit 30 the output of which is representative of the output of the selection cell $M_p$.

The function of this cell is to select either the bit of sum $(C_J+C_J-1)$ in register $R_{2P-1}$ or the bit of difference $(C_J-C_{J-1})$ in register $R_{2p}$ in terms of control signals d2 and $\overline{d2}$ which are indicative, as seen in FIG. 2*a*, of whether the two delta bits coming from registers $SR_1$ and $SR_2$ are of the same sign. If they are of the same sign, *d2* is low and gate A7 is closed whereas $\overline{d2}$ is high and A8 is open, thus selecting the bit of sum $(C_j + C_{j-1})$. If they are of the opposite sign, only gate A7 is open (d2 is high) and it is the bit of difference $(C_j - C_{j-1})$ which is selected. What has been said for cell $M_p$ might be repeated for the other cells $M_1$ through $M_{p-1}$ and, therefore, either sum $(C_j + C_{j-1})$ or difference $(C_j - C_{j-1})$ is found in parallel on the outputs of these cells as a function of the value of *d2* at given instant *t2*.

If now, the time-succession of instants *t2* is considered, within a coder bit period $\phi 1$, it can be seen that the outputs of cells $M_1$ through $M_p$ are successively representative of the sums and differences of two adjacent coefficients, corresponding to the sequence of signals *d2* which sequence corresponds itself to the relation between the values of the delta bits coming from registers $SR_1$ and $SR_2$ at successive instants *t2*.

A polarity selection circuit $P_1$ through $P_p$ is placed at the output of each cell $M_1$ through $M_p$. Cell $M_p$ output is applied to an AND gate A9. This gate is controlled by signal *d1* (FIG. 2*a*) as well as to an AND gate A10, through an inverter 14. That gate in turn is controlled by signal $\overline{d1}$ (FIG. 2*a*). The outputs of the two gates A9 and A10 are applied to an OR circuit 04.

The function of the polarity selection circuit $P_p$ is to pass the output of cell $M_p$ directly when signal *d1* is high, i.e., when the bit coming from register $SR_2$ (FIG. 2*a*) assumes value + 1. On the contrary, when signal *dl* is low ($\overline{dl}$ is high), i.e., when the bit coming from register $SR_2$ assumes value −1, circuit $P_p$ inverses cell $M_o$ output and supplies this inversed output.

For recapitulation of the function of the circuits shown in FIG. 3, it can be observed that, upon each instant *t2*, the outputs in parallel of polarity circuits $P_1$ through $P_p$ are representative of: $(C_j + C_{j-1})$ should the bits coming from registers $SR_1$ and $SR_2$ have both value + 1; $(C_j - C_{j-1})$ should the bits coming from $SR_1$ assume value − 1 and the bit coming from $SR_2$ assume value + 1, $\overline{C_j + C_{j-1}}$ should the bits coming from $SR_1$ and $SR_2$ assume, both value −1; and finally $\overline{C_j - C_{j-1}}$ should the bit coming from $SR_1$ assume value +1 and the bit coming from $SR_2$ assume value −1. In the last two cases, indeed, the aim to reach is to obtain $-(C_j + C_{j-1})$ and $-(C_j - C_{j-1})$ respectively. Since one operates on binary numbers, it will suffice to add a binary 1 in the position of the lowest rank of the two numbers $\overline{C_j + C_{j-1}}$ and $\overline{C_j - C_{j-1}}$, each time the bit coming from $SR_2$ assumes value −1.

This operation will be carried out in accumulator 27 as it will be seen now.

The outputs of circuits $P_1$ through $P_p$ are sent in parallel into accumulator 13 which upon each instant *t2*, accumulates the binary number present on these outputs with the binary numbers received at the preceding instants *t2*. This accumulator of the parallel type is well-known in the technique and will not be disclosed further on. For instance, it may include an adder followed with a register the outputs of which are brought back to the inputs of the adder. The number of positions in the accumulator will have to take the possible appearance of carries as well as the fact that the operated number may be negative, into account. By way of an example, there will be considered an accumulator with twelve bit positions, the bit coming from circuit $P_p$ being repeated in the four higher order positions according to the conventional processing principles of the binary numbers written in the two's complement code. The lowest order position in the accumulator receives, besides, signal $\overline{d1}$ which is equal to 1 each time the bit coming from $SR_2$ is equal to −1, and which is equal to 0 each time the bit coming from $SR_2$ is equal to − 1. This addition of a binary 1 into the lowest order position in the accumulator makes it possible to accumulate values $-(C_j + C_{j-1})$ or $-(C_j - C_{j-1})$ at the corresponding instants instead of values $\overline{C_j + C_{j-1}}$ or $\overline{C_j - C_{j-1}}$ which appear at the outputs of circuits $P_1$ through $P_p$, as explained above.

Upon each instant *t1*, the contents of accumulator 13 is unloaded into an output register 14. It should be noted that this contents is representative of a sample of the equalized signal according to a code which is no more the delta-code but a differential PCM code. The outputs of this register, then, are applied in parallel to a differential PCM-to-analog converter 15 in order to supply the equalized output analog signal.

I claim:

1. A process for carrying out the sum of two sequences of delta bits weighted with binary coefficients, one coefficient being assigned to each delta bit, wherein the process includes the following steps:
carrying out the sums and differences of the coefficients corresponding to the delta bits of the same rank in both sequences, in the parallel form,
comparing the values of the two delta bits of the same rank in both sequences,
fetching either the character representative of the sum of the corresponding coefficients, should the combination of the two bits be 11 or 00, or the character representative of the difference of the coefficients, should the combination be 01 or 10,
applying the binary character obtained at the preceding step, should the corresponding combination be 11 or 01, or the binary character representative of the value opposite to that represented by the character obtained at the preceding step, should the corresponding combination be 10 or 00, at the inputs of an accumulator,
accumulating the so-presented binary characters for each bit rank in the two delta bit sequences.

2. A device for carrying out the sum of the weightings of two delta bit sequences, respectively, by binary digital coefficients available in the parallel form, each delta bit of each sequence being assigned a weighting coefficient, the device includes:
logic summation means for summing the coefficients corresponding to the two bits of the same row in the two sequences in order to generate the sums and differences of said coefficients considered two by two,
comparison means receiving the delta bits of the same rank in both delta bit sequences to compare the values of these two bits and indicate whether they are equal or different,
selection means receiving the sum and difference of the two corresponding coefficients to select the sum or difference according as the comparison means are indicative of an equality or a difference, detection means receiving one of the two delta bits to detect its binary value, selection inversion means operating in response to the detection of a first binary value by the detection means in order to generate the binary character representative of the value opposite to the value represented by the sum or difference selected by the selection means, and to the detection of the second binary value by the detection means in order to pass, without any modification, the binary character representative of the sum or difference selected by the selection means, and accumulation means for accumulating the successive character coming from the selective inversion means as the two delta bit sequences are processed.

* * * * *